(12) United States Patent
Ou et al.

(10) Patent No.: US 10,996,157 B2
(45) Date of Patent: May 4, 2021

(54) SYSTEM AND METHOD FOR ONLINE DETECTION OF DROPLET DEPOSITION AMOUNT OF SPRAYING OPERATION OF PLANT PROTECTION MACHINE

(71) Applicant: JIANGSU UNIVERSITY, Jiangsu (CN)

(72) Inventors: Mingxiong Ou, Jiangsu (CN); Weidong Jia, Jiangsu (CN); Wei Yu, Jiangsu (CN); Pei Wang, Jiangsu (CN); Guangyang Mao, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 0 days.

(21) Appl. No.: 16/957,196

(22) PCT Filed: Aug. 31, 2018

(86) PCT No.: PCT/CN2018/103394
§ 371 (c)(1),
(2) Date: Jun. 23, 2020

(87) PCT Pub. No.: WO2019/140920
PCT Pub. Date: Jul. 25, 2019

(65) Prior Publication Data
US 2020/0333232 A1    Oct. 22, 2020

(30) Foreign Application Priority Data
Jan. 16, 2018    (CN) .......................... 201810038570.8

(51) Int. Cl.
*G01N 15/04*    (2006.01)
(52) U.S. Cl.
CPC .................................. *G01N 15/04* (2013.01)

(58) Field of Classification Search
CPC .. B05B 12/082; G01N 15/0026; G01N 15/04; G01N 15/0606; G01N 15/0656
See application file for complete search history.

(56) References Cited

U.S. PATENT DOCUMENTS 8,035,404 B2 * 10/2011 Schnell ............. G01N 15/0656
                                                         324/724
10,124,351 B2 * 11/2018 Yi ........................... G01F 23/22
(Continued)

FOREIGN PATENT DOCUMENTS

| CN | 102564790 A | * | 7/2012 |
| CN | 103063551 A | * | 4/2013 |
| CN | 106442235   |   | 2/2017 |

OTHER PUBLICATIONS

Luck et al., "Development and Preliminary Evaluation of a Spray Deposition Sensing System for Improving Pesticide Application," Sensors, 15(12), pp. 31965-31972 (Year: 2015).*
(Continued)

*Primary Examiner* — John Fitzgerald
(74) *Attorney, Agent, or Firm* — Wenderoth, Lind & Ponack, L.L.P.

(57) ABSTRACT

A system and method for online detection of a droplet deposition amount of a spraying operation of a plant protection machine, wherein the system is composed of parts such as a data processing module, a data collector, a temperature sensor, a spatial interdigital capacitive sensor, a communication module, a positioning module, a power supply module, and a control terminal, and wherein the spatial interdigital capacitive sensor is capable of outputting voltage data directly proportional to the droplet deposition amount; and provides a specific method and steps for detecting parameters of the droplet deposition amount, comprising: by the data processing module of the system for the online detection of the droplet deposition amount, acquiring (Continued)

Figure 1:
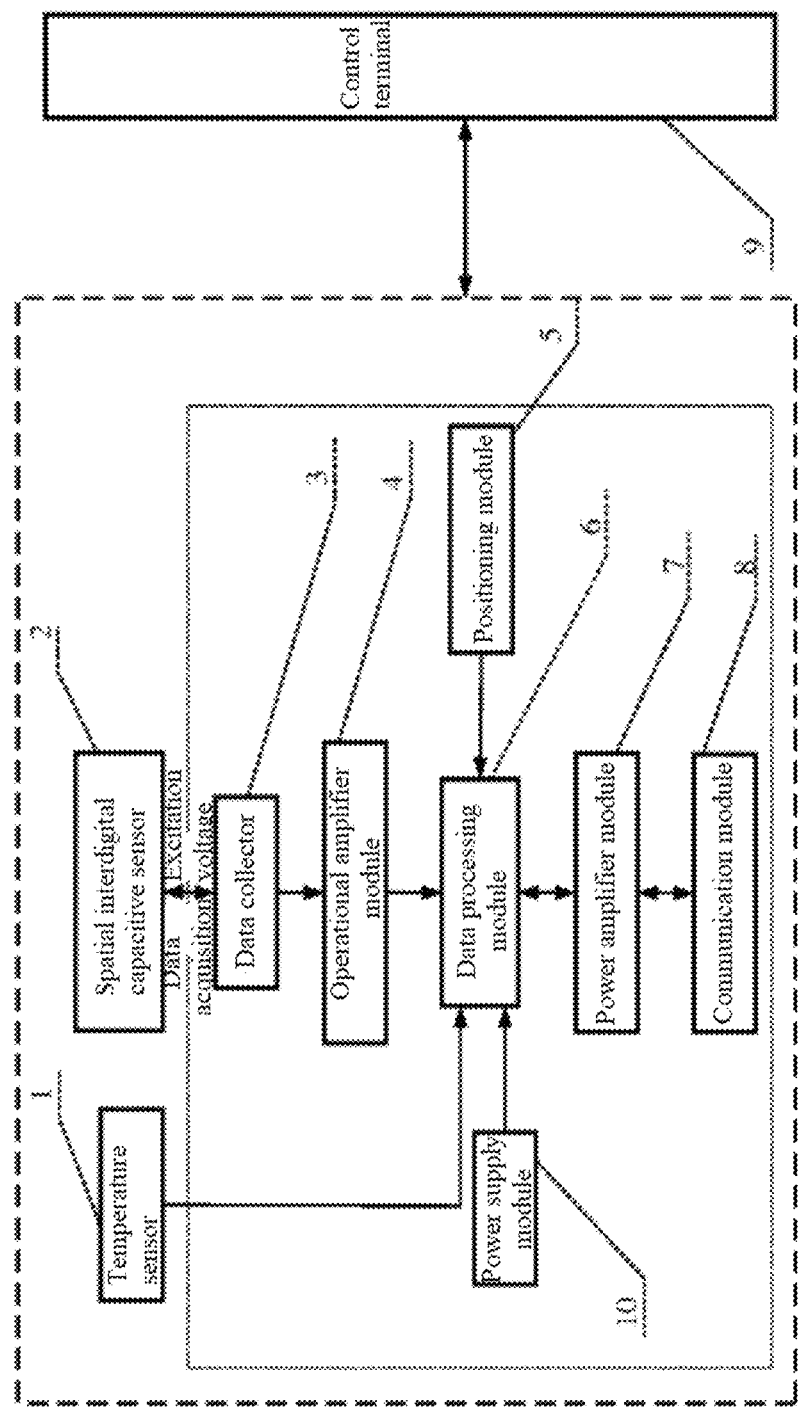

the voltage data output from the spatial interdigital capacitive sensor via the data collector and processing the voltage data, and transmitting the processed voltage data to the control terminal via the communication module.

7 Claims, 4 Drawing Sheets

(56) References Cited

U.S. PATENT DOCUMENTS

| | | | |
|---|---|---|---|
| 10,610,942 B2* | 4/2020 | Bergstrom | B23K 3/0623 |
| 10,786,858 B2* | 9/2020 | Bergstrom | H05K 3/321 |
| 10,799,892 B2* | 10/2020 | Yi | B05B 12/082 |
| 2009/0051376 A1* | 2/2009 | Schnell | G01N 15/0656 |
| | | | 324/724 |
| 2012/0018306 A1* | 1/2012 | Srinivasan | B01L 3/502761 |
| | | | 204/547 |
| 2016/0175859 A1* | 6/2016 | Yi | G01F 23/22 |
| | | | 239/690 |
| 2019/0060923 A1* | 2/2019 | Yi | G01F 23/22 |
| 2019/0145873 A1* | 5/2019 | Woolsey | G01N 15/10 |
| | | | 73/863.12 |
| 2020/0284710 A1* | 9/2020 | Occhipinti | G01N 15/0255 |
| 2020/0398290 A1* | 12/2020 | Yi | B05B 5/0255 |

OTHER PUBLICATIONS

Written Opinion of the International Searching Authority dated Nov. 20, 2018, in International (PCT) Application No. PCT/CN2018/103394, with English translation.

* cited by examiner

SYSTEM AND METHOD FOR ONLINE DETECTION OF DROPLET DEPOSITION AMOUNT OF SPRAYING OPERATION OF PLANT PROTECTION MACHINE

TECHNICAL FIELD

The present invention belongs to the field of intelligent machinery, and in particular, relates to a system and method for online detection of a droplet deposition amount of a spraying operation of a plant protection machine, i.e. combining wireless sensor network technology with droplet deposition amount sensors for real-time detection of droplet deposition amount data.

BACKGROUND

With the research and development of intelligent precision agriculture technology, precision pesticide application technology has been widely used in the prevention of crop diseases and insect pests. In spraying operation in environments such as field, forest and orchard, the deposition characteristics of a pesticide liquor on the plant surface directly affect the control effect of diseases and insect pests. The measurement of droplet deposition effect is generally completed by traditional detection methods such as water-sensitive paper and vessel sampling, so as to evaluate the spray effect.

At present, the methods for measuring the droplet deposition amount include coloring method, elution method, water-sensitive paper method, collecting method, image processing method and the like. In recent years, some researchers have combined the detection method using the water-sensitive paper with the image processing technology, including the following main process steps: attaching the water-sensitive paper to the front and back of the leaves of the plants, and then collecting the water-sensitive paper after the spraying operation, and analyzing and calculating the droplets deposited on the water-sensitive paper using the image processing method. However, this method has many problems, such as high measurement cost, slow layout speed and great disturbance to droplet motion. Moreover, Fox et al. (2003) investigated and compared two detection methods, image processing detection method and visual detection method, based on water-sensitive paper, and the comparison results showed that when the droplet coverage was more than 40%, the measurement results were undesirable.

The patent document with Publication Number CN106442235A discloses a device and method for detecting pesticide droplet deposition and evaporation. The detection device includes a coplanar interdigital capacitor, a high-frequency oscillator, a signal instantaneous period detection module and a data processing module. The detection method using the device for detecting the pesticide droplet deposition and evaporation includes tracking the coplanar interdigital capacitor and outputting a high-frequency oscillation signal with a variable frequency by using the high-frequency oscillator, collecting the high-frequency oscillation signal by the signal instantaneous period detection module and sending it to the data processing module for processing. Compared with the above patent, the present invention designs and adopts a novel spatial interdigital capacitive sensor with high adaptability, fast response and high accuracy, which can obtain more accurate data of the droplet deposition amount. Moreover, the method for detecting the reference voltage, ambient temperature, and droplet deposition amount provided by the present invention can eliminate the effects caused by different droplet sizes, different dosage forms of pesticide liquor, and ambient temperatures.

The patent document with Publication Number CN104596567A discloses a method and system for measuring uniformity of ground deposition of pesticide liquor. By combining sensor node devices with ad-hoc wireless sensor networks, the measuring system realizes automatic real-time collection of a droplet deposition amount of the pesticide liquor in a sprayed area, and achieves the evaluation of the uniformity of the deposition of the pesticide liquor in the sprayed area by statistical analysis of the droplet deposition amount with a computer. However, this patent does not provide a detailed structural design of the sensor for sensing the droplet deposition. The present invention designs a spatial interdigital capacitive sensor with high adaptability, fast response and high accuracy, which can obtain more accurate data of the droplet deposition amount, and provides a detailed method for detecting the reference voltage, ambient temperature, and droplet deposition amount.

Although the operation modes of small spray plant protection machines are being developed day by day, the above several methods for measuring the droplet deposition amount have disadvantages, such as cumbersome operation, heavy workload, and no real-time detection. At the same time, they would also be affected by various external environmental factors, resulting in a large error in the measurement results.

SUMMARY

In view of the above problems, the present invention provides a system and method for online detection of a droplet deposition amount of a spraying operation of a plant protection machine, namely, combination of droplet deposition amount sensors with wireless sensor network technology to complete data collection. A novel spatial interdigital capacitive sensor with high adaptability, fast response and high accuracy is designed and applied to realize the online detection of the droplet deposition amount with high accuracy, which is not affected by external factors.

For the above purposes, the present invention provides the following technical solutions.

The present invention relates to a system for online detection of a droplet deposition amount of a spraying operation of a plant protection machine, comprising a temperature sensor, a spatial interdigital capacitive sensor, a data collector, an operational amplifier module, a positioning module, a data processing module, a power amplifier module, a communication module, a control terminal, and a power supply module. The temperature sensor and the spatial interdigital capacitive sensor are configured to detect ambient temperature and the droplet deposition amount during the spraying operation. The data collector is configured to obtain a voltage signal output by the spatial interdigital capacitive sensor, and provide an excitation voltage for the spatial interdigital capacitive sensor. The operational amplifier module is configured to amplify voltage data collected by the spatial interdigital capacitive sensor. The positioning module is configured to detect position information of the system for the online detection of the droplet deposition amount. The data processing module is configured to process the voltage signal output by the spatial interdigital capacitive sensor, so as to obtain data of the droplet deposition amount. The power amplifier module is configured to amplify the transmitted data. The communication module is configured to send and receive the data. The control terminal is configured to send instructions to the data processing module. The power supply module is configured to provide power for the data processing module. The temperature sensor, positioning module and power supply module are directly connected to the data processing module. The spatial interdigital capacitive sensor is connected to the data processing module via the data collector and the operational amplifier module. The communication module is connected to the data processing module via the power amplifier module.

The spatial interdigital capacitive sensor can output the voltage signal directly proportional to the deposition amount of droplets deposited on the sensor, according to a change in a medium between interdigital capacitors, that is, a change in electrical conductivity. Before and after the spraying operation, the medium between the capacitors in the spatial interdigital capacitive sensor is air and gas-liquid mixture, respectively, which leads to an increase in the electrical conductivity between the capacitors and a consequent increase in the output voltage value, thereby the voltage data directly proportional to the droplet deposition amount is output.

The spatial interdigital capacitive sensor comprises a high-potential bus, low-potential side buses, interdigital electrodes, a substrate and a passivation layer. The high-potential bus, low-potential side buses and interdigital electrodes are composed of copper wires with different sizes. The high-potential bus is located on a center line of the sensor, the two low-potential side buses are separately located on both sides of the sensor parallel to the center line, and the interdigital electrodes are distributed between the high-potential bus and the low-potential side buses, and individually connected to the high-potential bus and the low-potential side buses. The substrate is located at bottom of the interdigital electrodes and configured to support the interdigital electrodes. The substrate is made of an insulating material, such as nylon material or polypropylene material, both of which have advantages, such as light weight, wear resistance and good corrosion resistance. The passivation layer uniformly covers surfaces of the interdigital electrodes and is made of silica material which can effectively protect the interdigital electrodes from being corroded and destroyed by pesticides, so as to extend service life of the sensor.

The spatial interdigital capacitive sensor is rectangular in shape, and the sensor has a length L between 60 and 80 mm, and a width W between 40 and 60 mm, wherein the L:W is between 1.1 and 1.5. The high-potential bus has a height $H_Z$ greater than a height $H_L$ of the low-potential side bus 11, wherein the $H_Z$ is between 0.3 and 0.8 mm, the $H_L$ is between 0.2 and 0.8 mm, and the $H_Z:H_L$ is between 1.1 and 1.3. The substrate of the sensor has a bottom surface completely filled with the interdigital electrodes, and the interdigital electrodes have side lines parallel to each other, and center lines perpendicular to the high-potential bus and the low-potential side buses to increase capacitance density of the spatial interdigital capacitive sensor. The adjacent interdigital electrodes are separated by a spacing Lt=(0.5-0.6) $D_{50}$, wherein the $D_{50}$ is volume median diameter of the spray droplets, and when $D_{50}>0.8$ mm, Lt is (0.5-0.6)×($D_{50}=0.8$ mm). Compared with other interdigital capacitive sensors, the spatial interdigital capacitive sensor with this size range has advantages, such as high accuracy, fast response and high adaptability.

The temperature sensor, the spatial interdigital capacitive sensor, the data collector, the operational amplifier module, the positioning module, the data processing module, the power amplifier module, the communication module and the power supply module constitute a wireless sensor network node, and the sensor network node is divided into two parts, a sensor module and a system control module. The sensor module includes the spatial interdigital capacitive sensor and the temperature sensor, and the system control module includes the data collector, the operational amplifier module, the positioning module, the data processing module, the power amplifier module, the communication module and the power supply module. The system control module is hermetically packaged to be isolated from external to form a system package box. In a field, the sensor node is installed by fixing the sensor network node in the field with a telescopic bracket. The telescopic bracket has an adjustable range between 0.3 and 1.2 m. The system package box is provided with a support plate at top, and the support plate has dense round holes for preventing water accumulation. The system package box is fixed on top of the telescopic bracket. The spatial interdigital capacitive sensor and the temperature sensor are placed on top of the support plate to make a surface of the spatial interdigital capacitive sensor parallel to the ground, and ensure that it is not covered by leaves of other plants. Because the support plate is provided with the dense round holes for preventing water accumulation, deposition of a pesticide liquor on the detection platform can be effectively avoided, thereby ensuring accuracy and absoluteness of measurement results of the droplet deposition amount.

With the data processing module, the droplet deposition amount, reference voltage and ambient temperature are measured by a method for detecting the droplet deposition amount, a method for detecting the reference voltage and a method for detecting the ambient temperature, and the data of the droplet deposition amount is analyzed and processed to eliminate effects of dosage form of a pesticide liquor, droplet size, and the ambient temperature, thereby improving detection accuracy of the spatial interdigital capacitive sensor to obtain more accurate data of the droplet deposition amount, which can provide a reliable and accurate basis for adjusting and controlling the spraying operation of the plant protection machine.

BRIEF DESCRIPTION OF THE DRAWINGS

FIG. 1 shows a block diagram of the overall structure of a system for online detection of a droplet deposition amount of a spraying operation of a plant protection machine according to the present invention.

FIG. 2 shows a structural diagram of a spatial interdigital capacitive sensor device according to the present invention.

FIG. 3 shows a line diagram of the field layout of the present invention in actual operation.

FIG. 4 shows a three-dimensional diagram of the field layout of the present invention in actual operation.

In FIG. 1: 1, temperature sensor; 2, spatial interdigital capacitive sensor; 3, data collector; 4, operational amplifier module; 5, positioning module; 6, data processing module; 7, power amplifier module; 8, communication module; 9, control terminal; and 10, power supply module.

In FIG. 2: 11, low-potential side bus; 12, high-potential bus; 13, interdigital electrode; 14, substrate; and 15, passivation layer.

In FIG. 3: 16, system package box; 17, support plate; 18, round hole for preventing water accumulation; and 19, telescopic bracket.

DETAILED DESCRIPTION OF THE EMBODIMENTS

The technical solutions and device structure of the present invention will be described clearly and completely below, with reference to the drawings in the embodiments of the present invention.

As shown in FIG. 1, a schematic structural diagram of a system for online detection of a droplet deposition amount of a spraying operation of a plant protection machine provided by an embodiment of the present invention is presented. The system combines wireless sensor network technology with a droplet deposition amount sensor to complete data collection and processing. The system comprises a temperature sensor 1, a spatial interdigital capacitive sensor 2, a data collector 3, an operational amplifier module 4, a positioning module 5, a data processing module 6, a power amplifier module 7, a communication module 8, a control terminal 9 and a power supply module 10. The temperature sensor 1, the positioning module 5 and the power supply module 10 are directly connected to the data processing module 6. The spatial interdigital capacitive sensor 2 is connected to the data processing module 6 via the data collector 3 and the operational amplifier module 4. The communication module 8 is connected to the data processing module 6 via the power amplifier module 7.

Moreover, the temperature sensor 1, spatial interdigital capacitive sensor 2, data collector 3, operational amplifier module 4, positioning module 5, data processing module 6, power amplifier module 7, communication module 8 and power supply module 10 constitute a wireless sensor network node. The sensor node is mainly configured to detect information data of the field and the node including air temperature, position information of the node, and information of the droplet deposition amount, and send the data to the control terminal 9 in a multi-hop transmission mode.

A data gathering node is mainly configured to receive data information transmitted by each of the sensor nodes, "pack" the data information, and send the packed data to the control terminal 9.

The control terminal 9 is configured to analyze and process the data from each of the nodes, feed back the processed data to the user to make the user know the quality of the spraying operation, and also provide reference for the next step of the operation.

The detection method and detection steps using the system for online detection of a droplet deposition amount of a spraying operation of a plant protection machine according to the present invention are as follows. During the spraying operation, a "Work 1" instruction is sent to the data processing module 6 from the control terminal 9, and voltage data output by the spatial interdigital capacitive sensor 2 is acquired by the data processing module 6 via the data collector 3 for a sampling period T, wherein the T is between 10 and 20 ms.

An array D1 is generated from the voltage data acquired within a sampling time T0 (0.4-1 s), and the coefficient of variation of the array D1 is calculated for comparison. If $CV_{D1} \leq 0.15$, then the calculation of the difference between the array D1 and reference voltage value is performed by the data processing module 6 to obtain an array $M1=\{M1_1; M1_2; M1_N\}$, which is sent to the control terminal 9 through the communication module 8, as the value of the droplet deposition amount of this spraying operation. If $CV_{D1} > 0.15$, then a new set of data is acquired by the data processing module. If the CVs of three consecutive sets of data are all less than 0.15, then $CV_{D1}$, $CV_{D2}$ and $CV_{D3}$ are compared.

An array $D_{min}$ corresponding to $CV_{min}$ is taken as the final voltage data, and then the difference between the array $D_{min}$ and the reference voltage value is calculated to obtain an array $M_{min}$. After that, the array $M_{min}$ is sent to the control terminal 9 through the communication module 8, as the value of the droplet deposition amount of this spraying operation.

A method for detecting the droplet deposition amount specifically includes the following steps.

During the spraying operation, a "Work 1" instruction is sent to the data processing module from the control terminal. Voltage data output by the spatial interdigital capacitive sensor is acquired by the data processing module via the data collector for a sampling period T, wherein the T is between 10 and 20 ms.

An array $D1=\{D1_1; D1_2; D1_3; \ldots ; D1_N\}$ is generated from the voltage data acquired within a sampling time T0 (0.4-1 s), and the coefficient of variation $CV_{D1}$ of the array D1 is calculated, wherein $$CV_{D1} = \frac{\sigma_{D1}}{\overline{D1}}, \sigma_{D1} = \sqrt{\frac{\sum_{i=1}^{N}(D1_i - \overline{D1})^2}{N}}, \text{ and } \overline{D1} = \frac{\sum_{i=1}^{N} D1_i}{N}.$$

If the $CV_{D1} \leq 0.15$, then the calculation of the difference between the array D1 and reference voltage value is performed by the data processing module to obtain an array $M1=\{M1_1; M1_2; \ldots ; M1_N\}$, which is sent to the control terminal 9 through the communication module, as the value of the droplet deposition amount of this spraying operation.

If the $CV_{D1} > 0.15$, then a new set of voltage data is acquired according to the sampling period T and the sampling time T0 to generate a new array, $D2=\{D2_1; D2_2; D2_3; \ldots ; D2_N\}$, and the coefficient of variation $CV_{D2}$ of the array D2 is calculated, wherein $$CV_{D2} = \frac{\sigma_{D2}}{\overline{D2}}, \sigma_{D2} = \sqrt{\frac{\sum_{i=1}^{N}(D2_i - \overline{D2})^2}{N}}, \text{ and } \overline{D2} = \frac{\sum_{i=1}^{N} D2_i}{N}.$$

If the $CV_{D2} \leq 0.15$, then the calculation of the difference between the array D2 and the reference voltage value is performed by the data processing module to obtain an array $M2=\{M2_1; M2_2; \ldots ; M2_N\}$, which is sent to the control terminal through the communication module, as the value of the droplet deposition amount of this spraying operation.

If the $CV_{D2} > 0.15$, then a new set of voltage data is acquired according to the sampling period T and the sampling time T0 to generate a new array, $D3=\{D3_1; D3_2; D3_3; \ldots ; D3_N\}$, and the coefficient of variation $CV_{D3}$ of the array D3 is calculated, wherein $$CV_{D3} = \frac{\sigma_{D3}}{\overline{D3}}, \sigma_{D3} = \sqrt{\frac{\sum_{i=1}^{N}(D3_i - \overline{D3})^2}{N}}, \text{ and } \overline{D3} = \frac{\sum_{i=1}^{N} D3_i}{N}.$$

If the $CV_{D3} \leq 0.15$, then the calculation of the difference between the array D3 and the reference voltage value is performed by the data processing module to obtain an array $M3=\{M3_1; M3_2; \ldots ; M3_N\}$, which is sent to the control terminal through the communication module, as the value of the droplet deposition amount of this spraying operation.

If the $CV_{D3}>0.15$, then the sampling is stopped in the data processing module and the values of the $CV_{D1}$, $CV_{D2}$ and $CV_{D3}$ are compared. An array $D_{min}$ corresponding to $CV_{min}$ is taken as the final voltage data, and then the difference between the array $D_{min}$ and the reference voltage value is calculated to obtain an array $M_{min}$. After that, the array $M_{min}$ is sent to the control terminal through the communication module, as the value of the droplet deposition amount of this spraying operation.

A method for detecting the reference voltage value includes the following steps.

Before the spraying operation, when a "Work 2" instruction is sent to the data processing module from the control terminal, voltage data is acquired by the data processing module via the data collector for a sampling period T.

An array $S=\{S_1; S_2; \ldots ; S_n\}$ is generated from the voltage data acquired within a sampling time T1 (0.8-2 s), and then, the average value $\overline{S}$ of the array S is calculated, wherein $$\overline{S} = \frac{\sum_{i=1}^{N} S_i}{n},$$

and the average value $\overline{S}$ of the array S is sent to the control terminal through the communication module, as a standard voltage for detecting the droplet deposition amount.

A method for detecting the ambient temperature includes the following steps.

When a "Work 2" instruction is sent to the data processing module from the control terminal, ambient temperature data output by the temperature sensor 1 is simultaneously collected by the data processing module for a sampling period T.

An array $Te0=\{Te0_1; Te0_2; \ldots ; Te0_n\}$ is generated from the temperature data acquired within a sampling time T1, and then, the average value $\overline{Te0}$ of the array Te0 is calculated, wherein $$\overline{Te0} = \frac{\sum_{i=1}^{N} Te0_i}{n},$$

and the average value $\overline{Te0}$ of the array Te0 is sent to the control terminal through the communication module 8, as the ambient temperature parameter before the spraying operation.

When a "Work 1" instruction is sent to the data processing module from the control terminal, the ambient temperature data output by the temperature sensor is simultaneously collected by the data processing module for the sampling period T.

An array $Te1=\{Te1_1; Te1_2; \ldots ; Te1_n\}$ is generated from the temperature data acquired within the sampling time T1, and then, the average value $\overline{Te1}$ of the array Te1 is calculated, wherein $$\overline{Te1} = \frac{\sum_{i=1}^{N} Te1_i}{n},$$

and the average value $\overline{Te1}$ of the array Te1 is sent to the control terminal through the communication module 8, as the ambient temperature parameter after the spraying operation.

Figure 2:
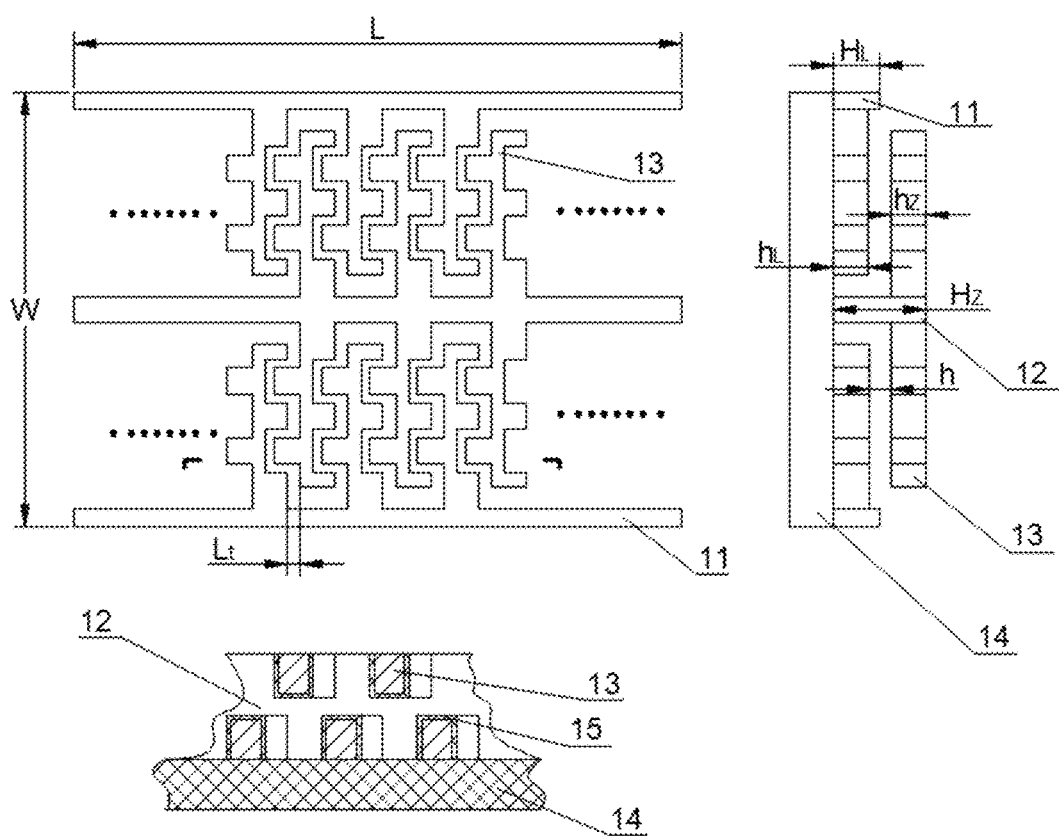

The present invention mainly uses a spatial interdigital capacitive sensor 2 (as shown in FIG. 2), which is prepared based on an interdigital electrode and can output a voltage signal directly proportional to the droplet deposition amount, to complete the collection of the droplet deposition amount. The sensor includes the following working steps. Before the spraying operation starts, the medium between the capacitors in the spatial interdigital capacitive sensor 2 is air. When the droplets are deposited on the surface of the spatial interdigital capacitive sensor 2, the dielectric constant and electrical conductivity of the medium between the capacitors are changed, resulting in a change in the output voltage of the sensor. At this time, the voltage difference corresponds to the deposition amount of the droplets deposited on the sensor.

Figure 3:
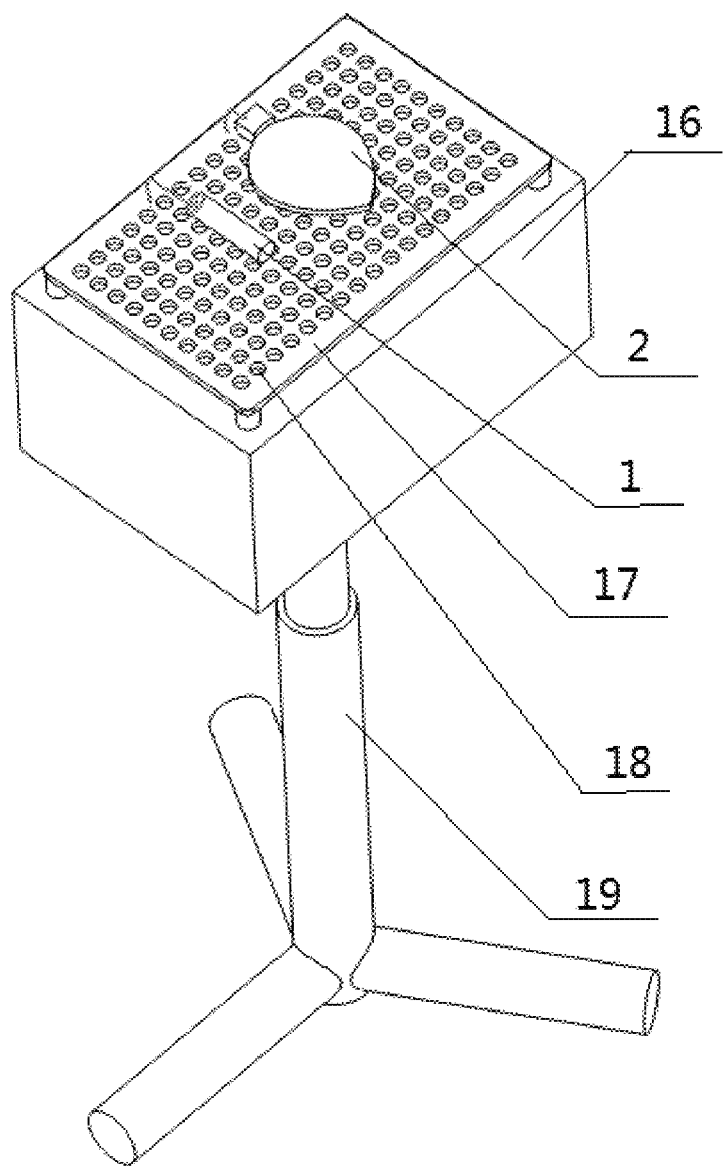
Figure 4:
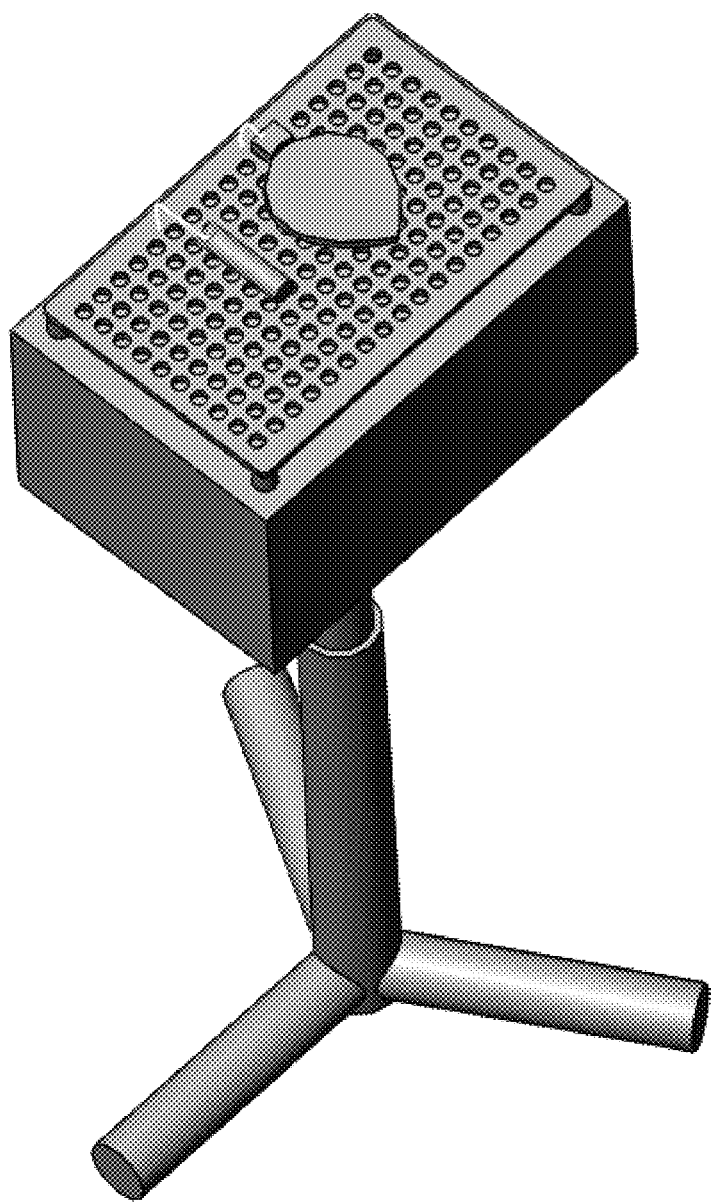

As shown in FIG. 3 and FIG. 4, the present invention is installed in the field by fixing the sensor network node in the field with a telescopic bracket 19. The telescopic bracket 19 has an adjustable range between 0.3 and 1.2 m. The system package box 16 is provided with a support plate 17 having a thickness of 1 mm at top, and the support plate 17 has dense round holes 18 for preventing water accumulation. The system package box is fixed on top of the telescopic bracket. The spatial interdigital capacitive sensor 2 and the temperature sensor 1 are placed on top of the support plate 17 to make a surface of the spatial interdigital capacitive sensor 2 parallel to the ground, and ensure that it is not covered by leaves of other plants.

The system for online detection of the droplet deposition amount has the following working principle. When the spraying operation is performed by the plant protection machine, fine droplets are deposited on the surface of the spatial interdigital capacitive sensor 2, resulting in a change in the electrical conductivity and dielectric constant due to the change of the medium (air-pesticide liquor) between two capacitor plates, so that the voltage value in response to it is output. After the filter and amplification process of the operational amplifier circuit and data collector 3, the voltage value is transmitted to the data processing module 6, so as to obtain the accurate droplet deposition amount. Finally, the signal is transmitted by the communication module 8, and the control terminal will receive values of droplet deposition amounts with different numbers (i.e. corresponding to different regions).

What is claimed is:

1. A system for online detection of a droplet deposition amount of a spraying operation of a plant protection machine, comprising:
a temperature sensor,
a spatial interdigital capacitive sensor,
a data collector,
an operational amplifier module,
a positioning module,
a data processing module,
a power amplifier module,
a communication module,
a control terminal, and
a power supply module,
wherein the temperature sensor and the spatial interdigital capacitive sensor are configured to detect ambient temperature and the droplet deposition amount during the spraying operation; the data collector is configured to obtain a voltage signal output by the spatial interdigital capacitive sensor, and provide an excitation voltage for the spatial interdigital capacitive sensor; the operational amplifier module is configured to amplify voltage data collected by the spatial interdigital capacitive sensor; the positioning module is configured to detect position information of the system for the online detection of the droplet deposition amount; the data processing module is configured to process the voltage signal output by the spatial interdigital capacitive sensor, so as to obtain data of the droplet deposition amount; the power amplifier module is configured to amplify the transmitted data; the communication module is configured to send and receive the data; the control terminal is configured to send instructions to the data processing module; the power supply module is configured to provide power for the data processing module; and the temperature sensor, the positioning module and the power supply module are directly connected to the data processing module, the spatial interdigital capacitive sensor is connected to the data processing module via the data collector and the operational amplifier module, and the communication module is connected to the data processing module via the power amplifier module, wherein the spatial interdigital capacitive sensor comprises a high-potential bus, low-potential side buses, interdigital electrodes, a substrate and a passivation layer, the high-potential bus, the low-potential side buses and the interdigital electrodes are composed of copper wires with different sizes, wherein the high-potential bus is located on a center line of the sensor, the two low-potential side buses are separately located on both sides of the sensor parallel to the center line, and the interdigital electrodes are distributed between the high-potential bus and the low-potential side buses, and individually connected to the high-potential bus and the low-potential side buses, the substrate is located at bottom of the interdigital electrodes and configured to support the interdigital electrodes, and is made of an insulating material, and the passivation layer uniformly covers surfaces of the interdigital electrodes and is made of silica material which can effectively protect the interdigital electrodes from being corroded and destroyed by pesticides, so as to extend service life of the sensor, and wherein the spatial interdigital capacitive sensor is rectangular in shape, and the sensor has a length L between 60 and 80 mm, and a width W between 40 and 60 mm, wherein the L:W is between 1.1 and 1.5; the high-potential bus has a height $H_Z$ greater than a height $H_L$ of the low-potential side bus, wherein the $H_Z$ is between 0.3 and 0.8 mm, the $H_L$ is between 0.2 and 0.8 mm, and the $H_Z$:$H_L$ is between 1.1 and 1.3; the substrate of the sensor has a bottom surface completely filled with the interdigital electrodes, and the interdigital electrodes have side lines parallel to each other, and center lines perpendicular to the high-potential bus and the low-potential side buses to increase capacitance density of the spatial interdigital capacitive sensor; the adjacent interdigital electrodes are separated by a spacing Lt=(0.5-0.6)$D_{50}$, wherein the $D_{50}$ is volume median diameter of the spray droplets, and when the $D_{50}$>0.8 mm, Lt is (0.5-0.6)×($D_{50}$=0.8 mm).

2. The system for the online detection of the droplet deposition amount of the spraying operation of the plant protection machine of claim 1, wherein the spatial interdigital capacitive sensor can output the voltage signal directly proportional to the deposition amount of droplets deposited on the sensor, according to a change in a medium between interdigital capacitors, that is, a change in electrical conductivity; before and after the spraying operation, the medium between the capacitors in the spatial interdigital capacitive sensor is air and gas-liquid mixture, respectively, which leads to an increase in the electrical conductivity between the capacitors and a consequent increase in the output voltage value, thereby the voltage data directly proportional to the droplet deposition amount is output.

3. The system for the online detection of the droplet deposition amount of the spraying operation of the plant protection machine of claim 1, wherein the temperature sensor, the spatial interdigital capacitive sensor, the data collector, the operational amplifier module, the positioning module, the data processing module, the power amplifier module, the communication module and the power supply module constitute a wireless sensor network node, and the sensor network node is divided into two parts, a sensor module and a system control module, wherein the sensor module comprises the spatial interdigital capacitive sensor and the temperature sensor, and the system control module comprises the data collector, the operational amplifier module, the positioning module, the data processing module, the power amplifier module, the communication module and the power supply module, and the system control module is hermetically packaged to be isolated from external to form a system package box; in a field, the sensor node is installed by fixing the sensor network node in the field with a telescopic bracket which has an adjustable range between 0.3 and 1.2 m, wherein the system package box is provided with a support plate at top, and the support plate has dense round holes for preventing water accumulation; the system package box is fixed on top of the telescopic bracket, and the spatial interdigital capacitive sensor and the temperature sensor are placed on top of the support plate to make a surface of the spatial interdigital capacitive sensor parallel to the ground, and ensure that it is not covered by leaves of other plants, and because the support plate is provided with the dense round holes for preventing water accumulation, deposition of a pesticide liquor on the detection platform can be effectively avoided, thereby ensuring accuracy and absoluteness of measurement results of the droplet deposition amount.

4. The system for the online detection of the droplet deposition amount of the spraying operation of the plant protection machine of claim 1, wherein with the data processing module, the droplet deposition amount, reference voltage and ambient temperature are measured by a method for detecting the droplet deposition amount, a method for detecting the reference voltage and a method for detecting the ambient temperature, and the data of the droplet deposition amount is analyzed and processed to eliminate effects of dosage form of a pesticide liquor, droplet size, and the ambient temperature, thereby improving detection accuracy of the spatial interdigital capacitive sensor to obtain more accurate data of the droplet deposition amount, which can provide a reliable and accurate basis for adjusting and controlling the spraying operation of the plant protection machine.

5. The system for the online detection of the droplet deposition amount of the spraying operation of the plant protection machine of claim 4, wherein the method for detecting the droplet deposition amount comprises the following steps:

during the spraying operation, sending a "Work 1" instruction to the data processing module from the control terminal, acquiring the voltage data output from the spatial interdigital capacitive sensor by the data processing module via the data collector for a sampling period T, wherein the T is between 10 and 20 ms;

generating an array $D1=\{D1_1; D1_2; D1_3; \ldots; D1_N\}$ from the voltage data acquired within a sampling time T0 of 0.4-1 s, and calculating a coefficient of variation $CV_{D1}$ of the array D1, wherein $$CV_{D1} = \frac{\sigma_{D1}}{\overline{D1}}, \sigma_{D1} = \sqrt{\frac{\sum_{i=1}^{N}(D1_i - \overline{D1})^2}{N}}, \text{ and } \overline{D1} = \frac{\sum_{i=1}^{N} D1_i}{N};$$

if the $CV_{D1} \leq 0.15$, then calculating a difference between the array D1 and the reference voltage value by the data processing module to obtain an array $M1=\{M1_1; M1_2; \ldots; M1_N\}$, which is sent to the control terminal through the communication module, as the value of the droplet deposition amount of this spraying operation;

if the $CV_{D1} > 0.15$, then acquiring a new set of voltage data according to the sampling period T and the sampling time T0 to generate a new array, $D2=\{D2_1; D2_2; D2_3; \ldots; D2_N\}$, and calculating a coefficient of variation $CV_{D2}$ of the array D2, wherein $$CV_{D2} = \frac{\sigma_{D2}}{\overline{D2}}, \sigma_{D2} = \sqrt{\frac{\sum_{i=1}^{N}(D2_i - \overline{D2})^2}{N}}, \text{ and } \overline{D2} = \frac{\sum_{i=1}^{N} D2_i}{N};$$

if the $CV_{D2} \leq 0.15$, then calculating a difference between the array D2 and the reference voltage value by the data processing module to obtain an array $M2=\{M2_1; M2_2; \ldots; M2_N\}$, which is sent to the control terminal through the communication module, as the value of the droplet deposition amount of this spraying operation;

if the $CV_{D2} > 0.15$, then acquiring a new set of voltage data according to the sampling period T and the sampling time T0 to generate a new array, $D3=\{D3_1; D3_2; D3_3; \ldots; D3_N\}$, and calculating a coefficient of variation $CV_{D3}$ of the array D3, wherein $$CV_{D3} = \frac{\sigma_{D3}}{\overline{D3}}, \sigma_{D3} = \sqrt{\frac{\sum_{i=1}^{N}(D3_i - \overline{D3})^2}{N}}, \text{ and } \overline{D3} = \frac{\sum_{i=1}^{N} D3_i}{N};$$

if the $CV_{D3} \leq 0.15$, then calculating a difference between the array D3 and the reference voltage value by the data processing module to obtain an array $M3=\{M3_1; M3_2; \ldots; M3_N\}$, which is sent to the control terminal through the communication module, as the value of the droplet deposition amount of this spraying operation; and if the $CV_{D3} > 0.15$, then stopping the sampling in the data processing module and comparing the values of the $CV_{D1}$, $CV_{D2}$ and $CV_{D3}$, taking an array $D_{min}$ corresponding to $CV_{min}$ as final voltage data, and then, calculating a difference between the array $D_{min}$ and the reference voltage value to obtain an array $M_{min}$, and then, sending the array $M_{min}$ to the control terminal through the communication module, as the value of the droplet deposition amount of this spraying operation.

6. The system for the online detection of the droplet deposition amount of the spraying operation of the plant protection machine of claim 4, wherein the method for detecting the reference voltage value comprises the following steps:

before the spraying operation, when sending a "Work 2" instruction to the data processing module from the control terminal, acquiring the voltage data by the data processing module via the data collector for a sampling period T;

generating an array $S=\{S_1; S_2; \ldots; S_n\}$ from the voltage data acquired within a sampling time T1 of 0.8-2 s, and then, calculating an average value $\overline{S}$ of the array S, wherein $$\overline{S} = \frac{\sum_{i=1}^{N} S_i}{n},$$

and sending the average value $\overline{S}$ of the array S to the control terminal through the communication module, as a standard voltage for detecting the droplet deposition amount.

7. The system for the online detection of the droplet deposition amount of the spraying operation of the plant protection machine of claim 4, wherein the method for detecting the ambient temperature comprises the following steps:

when sending a "Work 2" instruction to the data processing module from the control terminal, simultaneously collecting ambient temperature data output from the temperature sensor by the data processing module for a sampling period T, generating an array $Te0=\{Te0_1; Te0_2; \ldots; Te0_n\}$ from the temperature data acquired within a sampling time T1, and then, calculating an average value $\overline{Te0}$ of the array Te0, wherein $$\overline{Te0} = \frac{\sum_{i=1}^{N} Te0_i}{n},$$

and sending the average value $\overline{Te0}$ of the array Te0 to the control terminal through the communication module, as an ambient temperature parameter before the spraying operation;

when sending a "Work 1" instruction to the data processing module from the control terminal, simultaneously collecting the ambient temperature data output from the temperature sensor by the data processing module for the sampling period T;

generating an array $Te1=\{Te1_1; Te1_2; \ldots; Te1_n\}$ from the temperature data acquired within the sampling time T1, and then, calculating an average value $\overline{Te1}$ of the array Te1, wherein $$\overline{Te1} = \frac{\sum_{i=1}^{N} Te1_i}{n},$$

and sending the average value $\overline{Te1}$ of the array Te1 to the control terminal through the communication module, as an ambient temperature parameter after the spraying operation.

* * * * *